United States Patent
Barthelmie et al.

(10) Patent No.: US 7,882,613 B2
(45) Date of Patent: Feb. 8, 2011

(54) METHODS FOR APPLYING MAGNETS TO COMPONENT SURFACES

(75) Inventors: Frank Barthelmie, Ostfildern (DE);
Jochen Schulze, Reutlingen (DE);
Nis-Anton Möllgaard, Schorndorf (DE);
Uwe Resag, Aichtal (DE)

(73) Assignee: ThyssenKrupp Aufzugswerke GmbH, Neuhausen A.D.F. (DE)

( * ) Notice: Subject to any disclaimer, the term of this patent is extended or adjusted under 35 U.S.C. 154(b) by 782 days.

(21) Appl. No.: 11/678,861

(22) Filed: Feb. 26, 2007

(65) Prior Publication Data

US 2007/0199192 A1 Aug. 30, 2007

(30) Foreign Application Priority Data

Feb. 24, 2006 (EP) .................................. 06003785
Apr. 6, 2006 (EP) .................................. 06007298

(51) Int. Cl.
*H02K 15/00* (2006.01)

(52) U.S. Cl. .......................... 29/596; 29/598; 29/527.1; 29/609; 29/607; 29/732

(58) Field of Classification Search ................... 29/596, 29/598, 732, 527.1, 609, 607, 606; 310/216, 310/268, 43, 45, 26, 46; 264/DIG. 58; 204/297.02
See application file for complete search history.

(56) References Cited

U.S. PATENT DOCUMENTS 4,748,738 A 6/1988 Nayar

| | | | | |
|---|---|---|---|---|
| 5,270,600 A | * | 12/1993 | Hashimoto | ................. 310/75 D |
| 5,453,972 A | * | 9/1995 | Kanazawa et al. | .......... 720/659 |
| 5,920,139 A | * | 7/1999 | Fujiwara et al. | ........ 310/154.11 |
| 6,386,505 B2 | * | 5/2002 | Schob | ........................... 251/7 |
| 6,824,657 B1 | * | 11/2004 | Fischer | .................. 204/297.02 |
| 6,889,422 B2 | * | 5/2005 | Doi | ........................... 29/602.1 |
| 2005/0246886 A1 | | 11/2005 | Morel | |

FOREIGN PATENT DOCUMENTS

DE 102004039807 * 2/2006
DE 102004039807 A1 2/2006

* cited by examiner

*Primary Examiner*—Derris H Banks
*Assistant Examiner*—Tai Nguyen
(74) *Attorney, Agent, or Firm*—Lathrop & Gage LLP

(57) ABSTRACT

A method of applying at least one magnet to a surface of a component made of a magnetic material includes placing the at least one magnet in a holding apparatus, and positioning the holding apparatus in the immediate vicinity of the component. A holding element applies a holding force to the at least one magnet to hold it in the holding apparatus. The holding element is deactivated such that the holding force is reduced, and the at least one magnet is transferred to the surface of the component. A holding apparatus for applying at least one magnet to a surface of a component made of a magnetic material includes a surface region for supporting the at least one magnet and at least one deactivatable holding element for applying a force on the at least one magnet.

6 Claims, 4 Drawing Sheets

METHODS FOR APPLYING MAGNETS TO COMPONENT SURFACES

RELATED APPLICATIONS

This application claims priority to EP 06003785.0, filed Feb. 24, 2006 and EP 06007298.0, filed Apr. 6, 2006, the disclosures of which are incorporated herein by reference.

FIELD

The invention relates to a method and an apparatus for applying magnets to components made of magnetic materials. In particular, the method according to the invention and the associated apparatus may be used for the manufacture of rotors with permanent magnets for electric motors, especially for electric motors for elevators.

BACKGROUND

For some years, motors having rotors fitted with permanent magnets have been used for elevator drives. The rotors may be constructed as internal rotors with permanent magnets mounted on their outside, or as external rotors with permanent magnets mounted on their inside. The task of properly fitting the rotors with permanent magnets is a comparatively onerous one.

In a known method, plastic films or aluminum strips, for example, which have recesses having a shape of magnets are adhesively bonded to the rotor surface. An adhesive is then applied to the reverse of the magnets, and the magnets are placed individually in the recesses. Care has to be taken to ensure that the magnets have been inserted correctly and cleanly in their recesses in spite of their magnetic force, as they are strongly attracted to the rotor surface and are influenced by magnets that have already been positioned. As the magnets always have to be attached with a small gap from one magnet to the next, there is the danger of slippage, and the operator has to wait for the adhesive to cure on each magnet before the next magnet can be attached. Thus, this method of rotor manufacture is very time-consuming.

EP 1 255 343 A2 discloses a method in which magnets are arranged in a row on a ring. As many rings as are needed are for the motor are attached side by side on a basic ring body. This ensures that the rings comprising the magnets can be rotated through a small angle relative to one another, so as to reduce or completely eliminate surges in the true running of the motor at the beginning and end of the magnets. However, the fact that the magnets have to be individually fastened to the rings and that the rings have to be fixed to the base member with no imbalances continues to be a problem.

EP 1 605 574 A1 discloses prefabricating the pole surfaces by segmenting the rotor surface into pole surfaces to reduce manufacturing costs. However, a guided arm or servo positioner is needed for each pole around the rotor when assembling the finished rotor for each pole, which leads to a major expense if there are a number of poles. Additionally, the magnets still have to be applied to the pole surfaces and attached thereto.

There is a need to simplify and speed up the production of a rotor with permanent magnets, thereby significantly reducing the rotor's cost, particularly in elevator drive applications.

SUMMARY

The method according to the invention may be used to apply at least one magnet to a component made of a magnetic material, wherein the at least one magnet is applied to a surface of the component. The at least one magnet is held in a holding device by a holding force acting by means of a holding element, and the holding device is positioned in the immediate vicinity of the component. The effective holding force is reduced by deactivating the holding element, and the at least one magnet is transferred to a surface of the component.

The method may be used to produce an electric motor including a rotor having magnets and a stator. The magnets are attached to a surface of the rotor facing in the direction of the stator, wherein the magnets for mounting on the rotor's surface are initially arranged in the holding device which extends complementary to the rotor's surface.

In one embodiment of the invention, at least one row of magnets extending around the circumference of a pole is placed in pockets in a holding device. Each magnet of the row is provided with adhesive, and each magnet of entire row is simultaneously applied to the rotor's surface. An advantageous aspect is that a time needed for curing, e.g., 90 seconds, runs concurrently for all the magnets of the row and therefore only elapses once. Another advantageous aspect is that by using the method and the holding device, it is not possible for the magnets to slip after being applied to the rotor surface, as the magnets still project somewhat into the pockets even after being transferred from the pockets of the device onto the rotor surface, because, for example, the magnets are 4 mm thick, and the distance between the holding device and the rotor is only 3 mm.

In the method according to the invention, after a row of magnets extending over the circumference of the rotor has been applied to the rotor's surface, the holding apparatus with a new row of magnets is positioned directly adjacent to the row of magnets previously applied. The new row of magnets is then applied adjacent to the row of magnets previously applied.

In an embodiment, the at least one magnet is preferably adhesively bonded to the surface. Additionally, in an embodiment, the method according to the invention is carried out with robot assistance.

According to the invention, in order to produce an electric motor having a rotor and a stator, wherein the rotor has permanent magnets adhesively bonded to a surface of the rotor which faces towards a stator, the magnets are first arranged on an apparatus formed opposite the rotor's surface. The apparatus is then positioned at a short distance from the rotor's surface, and the magnets are applied to the rotor's surface.

In an embodiment of the invention, the rotor is fixedly positioned in a state of readiness for the adhesive bonding. A row of magnets is arranged on an apparatus for application to the rotor's surface. The magnets are arranged on the apparatus such that the magnets will extend around the circumference of the rotor if the apparatus is positioned opposite the rotor's surface. Adhesive is applied to the free magnet surface, and the apparatus is positioned at a short distance from the rotor surface. The magnets are simultaneously applied to the rotor's surface. The rotor's surface may be treated using a robot's assistance; alternately, the rotor's surface may treated solely by use of a robot.

The robot is able to execute the following steps: (1) bringing the rotor from a conveyor to a preparation area and pretreating a surface of the rotor to which adhesive is to be applied, (2) positioning the rotor on a magnet sticking area and applying adhesive to the magnets using a metering or gluing device, (3) positioning the apparatus close to the rotor's surface, (4) transferring the magnets from the apparatus onto the rotor's surface, (5) bringing the apparatus to the fitting area, (6) bringing the rotor from the magnet sticking area to an onward conveyor, (7) positioning the rotor in a painting booth and applying corrosion protection to at least to the part of the rotor fitted with magnets, and (8) placing the rotor on an onward conveyor.

In an embodiment, when a magnet is placed on a magnet area in a holding apparatus, the magnet is held in the magnet area by its own magnetic force on a pin located under the magnet area. After the holding apparatus has been positioned a small distance from a rotor's surface, the magnet is detached from the pin by pulling the pin. The magnet's own magnetic force causes the magnet to be applied to the rotor's surface, and the magnetic force holds the magnet in place until adhesive holding the magnet to the rotor's surface has cured.

Ejectors may be provided at the pin ends; suggest ejectors assist with the removal of magnets from pockets in the holding apparatus if the magnets become jammed in the pockets due to size variation among the magnets. The ejectors enable the magnets to be deliberately pressed out of the apparatus. The pins arranged in recesses under the magnets may be at least partly pulled out from a magnet area parallel to the magnet surface; ejectors arranged on the pin ends then release magnets which have not yet been transferred from the pockets to the rotor's surface. The magnets flip onto the rotor surface by their own magnetic force after they are released from the pockets.

The pins may be divided into groups, so that the pins in one group are moved together. Various groups may be moved in succession or simultaneously. Simultaneous movement of the pins is assisted by the fact that pins of a group are joined together at one end and can therefore be moved simultaneously.

In an embodiment, the adhesive is applied to the individual magnets in finely metered amounts, wherein the metered amount is based on a layer thickness obtained after curing.

The holding apparatus according to the invention serves to apply at least one magnet. The apparatus may be used for carrying out the methods described above. The holding apparatus includes a surface region which is designed to complement a surface of a component on which the magnets are to be applied, while at least one deactivatable holding element is provided for applying or exerting a force on the at least one magnet which is to be mounted on the surface region. The surface region of the apparatus is particularly of such dimensions that locations are provided for a row of magnets to be arranged around the circumference of a rotor, and a movable pin is arranged as a holding element under each magnet location.

Moreover, at least one guide for the at least one magnet is provided on the surface region of the apparatus in this embodiment. At least the surface region of the apparatus may consist of a non-magnetic material and the at least one holding element may consist of a magnetic material.

If a magnet is pre-magnetized, the magnet may stick to the pin of magnetic material when placed in the apparatus. If a magnet is not pre-magnetized, the magnet is held in the apparatus by a self-magnetized pin.

According to the invention, the holding apparatus can be positioned on the hub of a rotor at a short distance from a rotor's surface by means of a sleeve. The axial lengths of the rotor and the holding apparatus with sleeve are such that a radially correct position of the holding apparatus is reached before magnets arranged on the holding apparatus move into a position of congruency with the rotor surface to which they are to be attached.

In an embodiment, the apparatus for carrying out the method includes an apparatus body having a surface region with a shape that matches a complementary rotor surface to be fitted with magnets. Locations are provided on the surface region for at least a row of magnets to be placed around the circumference of the rotor. Such locations take the form of pockets having a depth of which is equal to the thickness of the magnets. A movable pin is provided under each magnet location; such moveable pin functions as a holding element for securing the magnet to be placed in the pocket. The pin is arranged under the pocket such that it is movable in a longitudinal direction. When the pin is moved in the longitudinal direction, the pin's outer surface just reaches a surface of the pocket; a thin strip of the pin's outer surface thereby makes contact with a magnet located in the pocket. After deactivation or removal of the pin from the underside of the magnet, the magnet is no longer held on the holding apparatus.

It is particularly advantageous to use robots to manufacture the rotors. A rotor is lifted by the robot, e.g., from a conveyor supplying it onto a preparation area. The apparatus, which is positioned in a loading area, is in the meantime advantageously loaded with magnets by an operator, the operator positioning the magnets in the pockets and checking them visually for breaks, damage and corrosion. Such loading of the apparatus with magnets could also be done by the robot. Then the robot applies adhesive to the magnets in the apparatus using an adhesive device. It is advantageous if the adhesive device comprises metering means which measure out the amount of adhesive to be applied to a magnet in terms of pressure and time, while the robot carries out the corresponding actions for spreading the adhesive thinly and evenly over the magnet. After the spreading of the adhesive, the robot brings the apparatus to the rotor and positions the apparatus close to the rotor surface, so that the magnets are positioned directly opposite the locations provided for them on the rotor's surface. Then the robot pulls the pins holding the magnets in the apparatus out of their holding position, and using the ejectors at the ends of the pins, the magnets are released from their locations in the apparatus and jump onto the rotor's surface. After waiting for the adhesive to cure, which for example may take 90 seconds, the robot brings the apparatus back to the loading area and then brings the rotor from the magnet adhering area to an onward conveyor. The robot then positions the rotor in a painting booth and the robot applies paint at least to the area of the rotor surface fitted with magnets in order to protect the magnets from corrosion. Then the rotor is taken to another conveyor by the robot.

According to one feature, the apparatus includes magnet locations in the form of pockets on the surface on which the magnets are to be mounted; such pockets correspond to the shape of the magnets and can act as a guide. Preferably, the magnets fit exactly into these pockets.

On a side of the pocket not facing the rotor, a recess is formed in a axial direction in the holding apparatus for a pin which is axially movable therein as a holding element.

The pins may be divided into groups, and the pins in one group may be joined together at one end and movable together by means of the join.

According to one feature, the pins have, at their end located under the pocket, a preferably non-magnetic ejector which projects beyond the side of the pin facing the magnet.

The holding apparatus, which can be positioned in relation to the rotor surface to which magnets are to be adhered by means of at least one part of its inner or outer contour, is preferably capable of being positioned directly on an inner or outer contour of the rotor.

Further features and advantages of the invention will become apparent from the description and the accompanying drawings.

It will be understood that the features mentioned above and those to be described hereinafter may be used not only in the combination specified but also in other combinations or on their own without departing from the scope of the present invention.

The invention is diagrammatically illustrated by means of embodiments by way of example shown in the drawings and is hereinafter described in detail with reference to the drawings.

BRIEF DESCRIPTION OF THE DRAWINGS

FIG. 2b shows a side view of the holding apparatus according to FIG. 2a.

FIG. 3 is a cross sectional view of a rotor and the holding apparatus taken along line A-A of FIG. 2a.

DETAILED DESCRIPTION OF THE DRAWINGS

Figure 1:
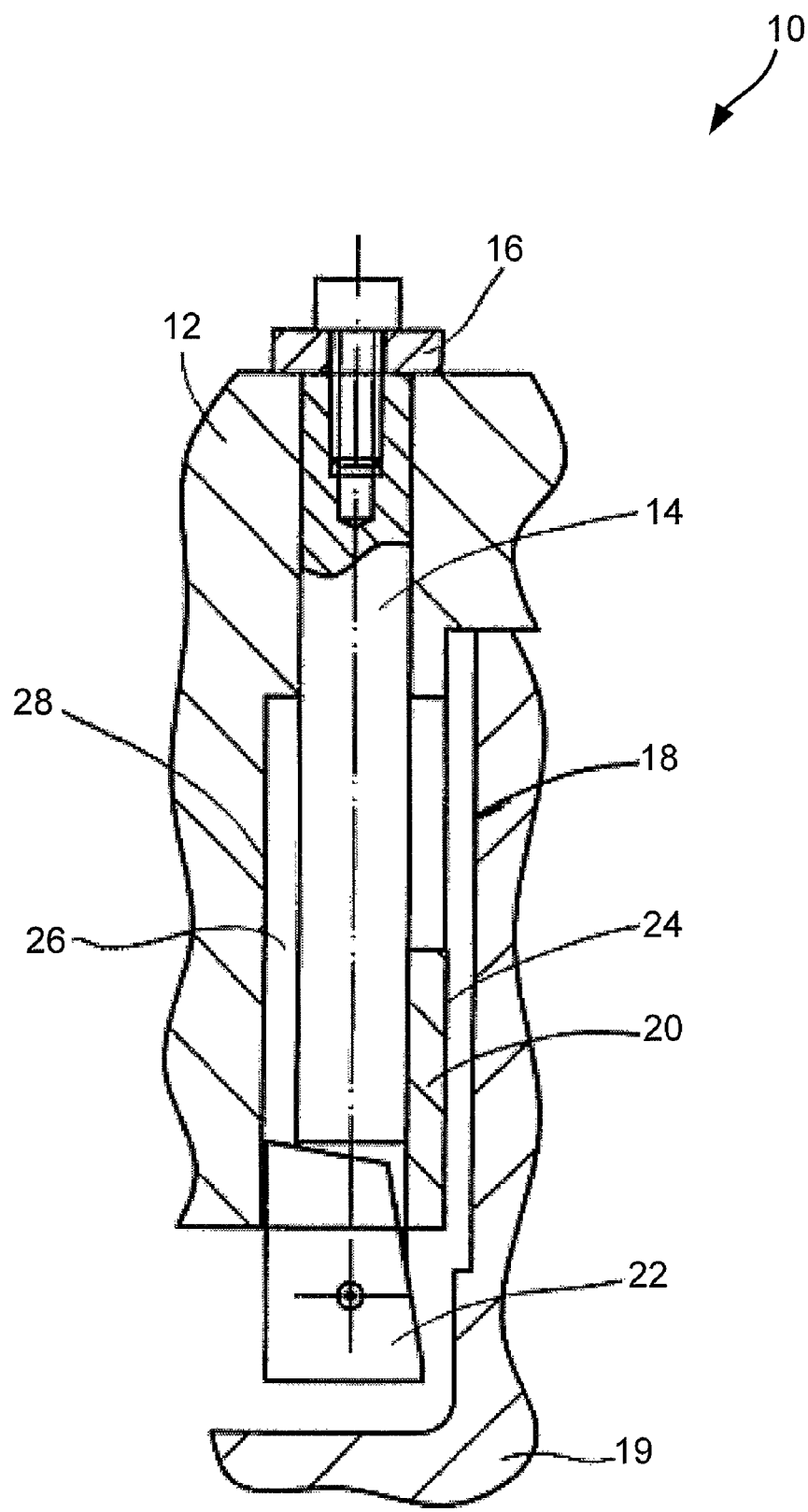
FIG. 1 schematically illustrates detail of a holding apparatus.

FIG. 1 diagrammatically shows a detail of a holding apparatus which is generally designated 10. FIG. 1 shows an apparatus body 12, a magnetic pin 14, a connection 16 for pins 14, a rotor surface 18 of a rotor 19 to which magnets are to be adhered to, a magnet plate 20, and a non-magnetic ejector 22.

The magnet plate 20 initially sticks to the pin 14 in the apparatus body 12 by the magnet plate 20's own magnetic force. By raising the pin 14, an area of congruency, and hence a magnetic attraction between the magnet plate 20 and pin 14, is reduced. The magnet plate 20 jumps over to the surface 18 of the rotor 19, further assisted by the non-magnetic ejector 22. The surface 24 of the magnet plate 20 facing the rotor 19 is covered with adhesive.

A recess 26 in which the pin 14 is accommodated provides a sliding or travel surface 28 for the ejector 22.

Figure 2A:
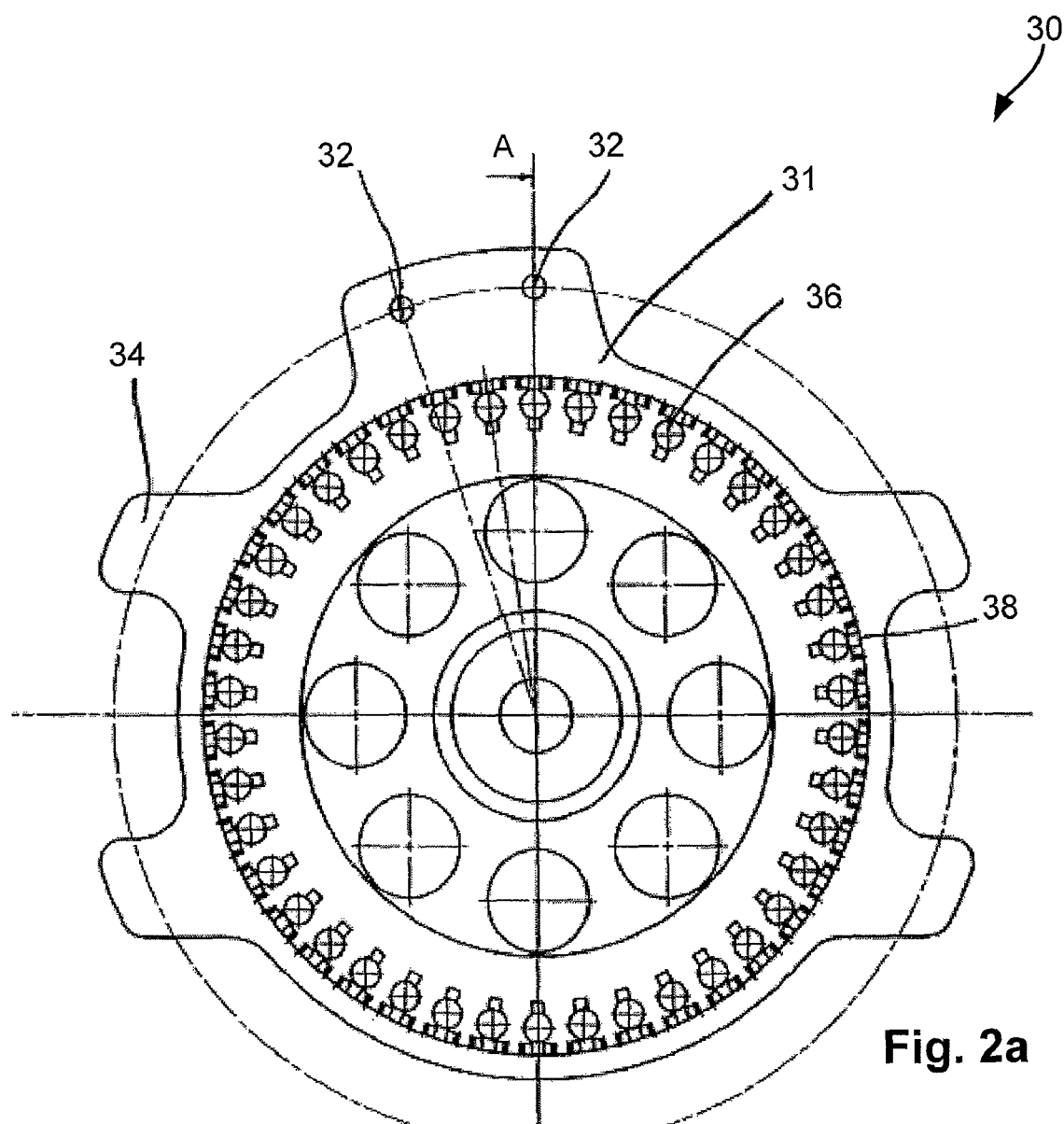
FIG. 2a shows a plan view of a holding apparatus.
Figure 2B:
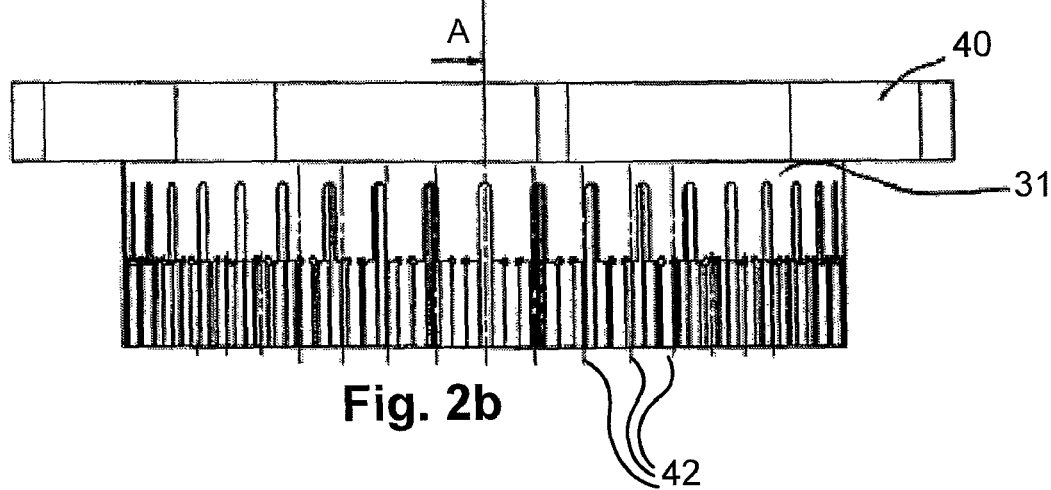

FIG. 2a shows a plan view of holding apparatus 30 with an apparatus body 31 according to the invention. Bores 32 for aligning the offset of the rows of magnets and a handle 34 for manually aligning the apparatus 30 can be seen, the handle 34 being formed on a contact plate 40 (FIG. 2b). Also shown in FIG. 2a are recesses 36 for pins and pockets 38 for magnets which are to be applied.

FIG. 2b shows a side view of the holding apparatus 30. Elements shown in FIG. 2b include an apparatus body 31, the contact plate 40, and magnet locations 42.

Figure 3:
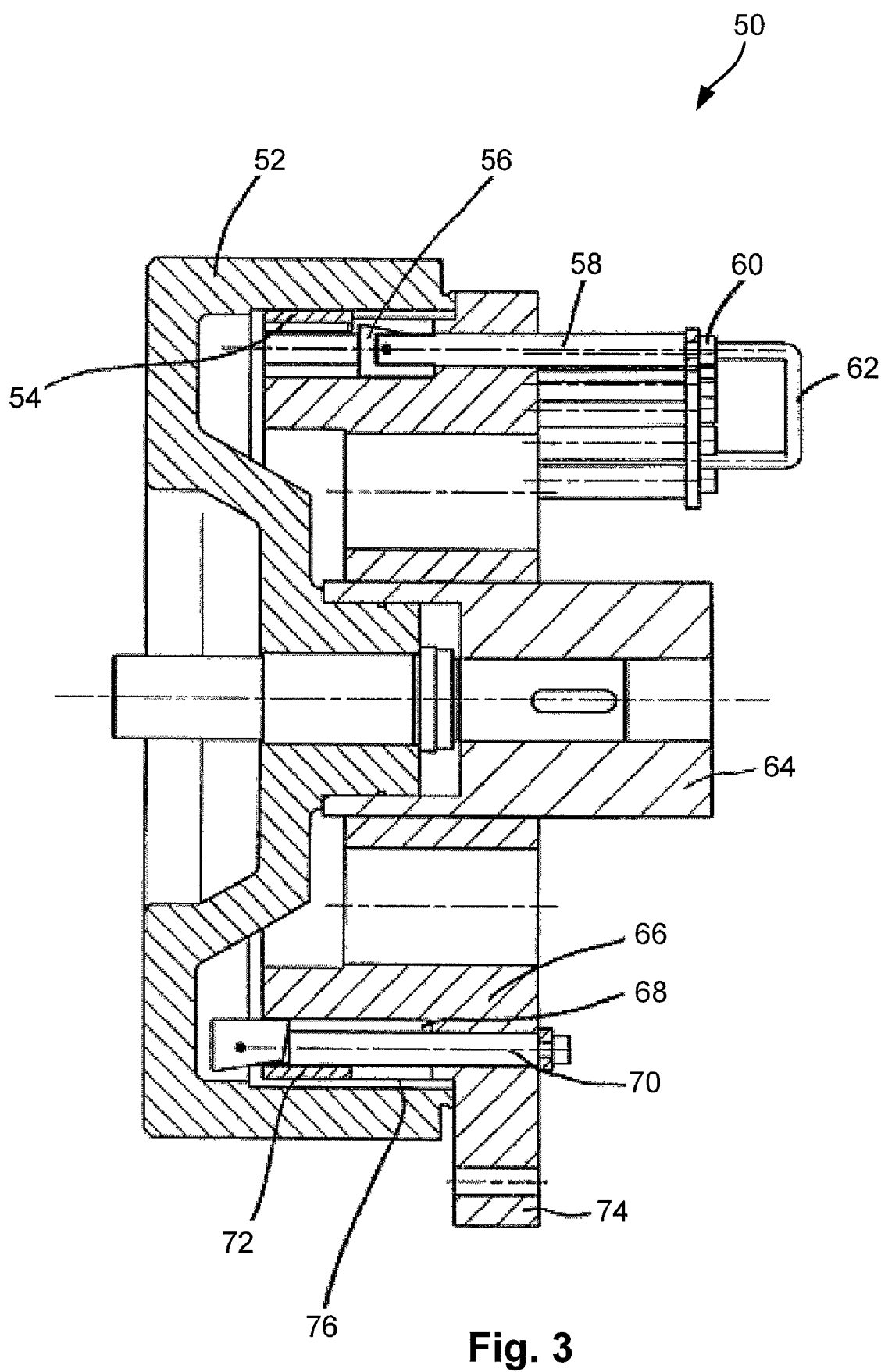

FIG. 3 shows details of another holding apparatus 50. Elements shown in FIG. 3 include a rotor 52, a magnet 54 which has jumped onto the rotor 52, an ejector 56, an extended pin 58, a connection 60 for pins 58, a handle 62 for pulling out the pins 58, a sleeve 64, an apparatus body 66, a recess 68, a pushed-in pin 70, a magnet 72 sticking to the holding apparatus 50, and a contact plate 74. There is a small spacing 76 between the rotor surface and magnet 72, which is about 3 mm.

Figure 4:
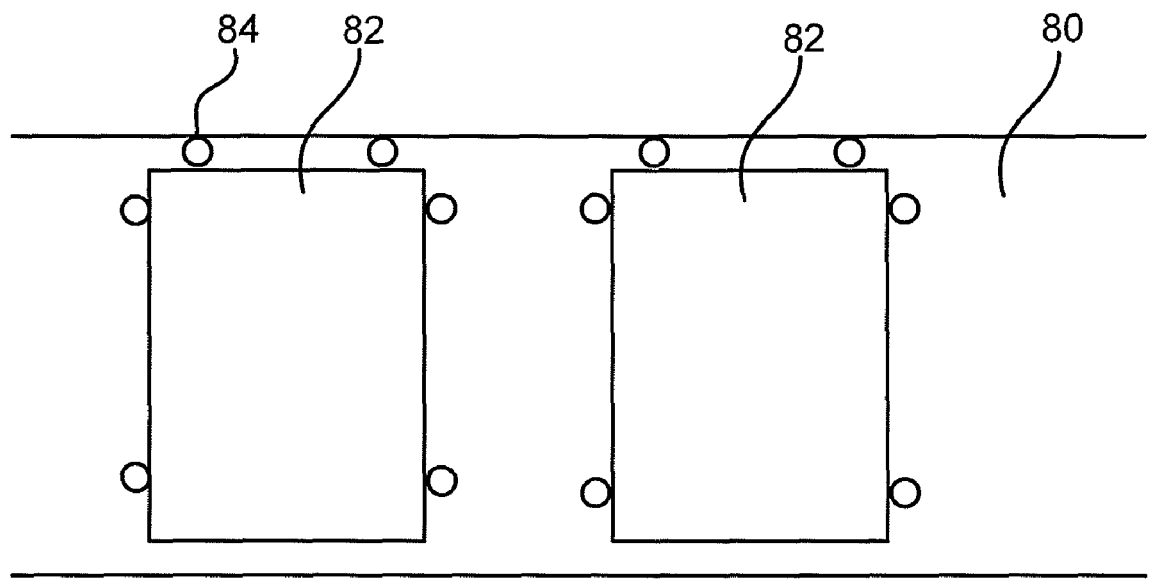
FIG. 4 shows magnets mounted on a holding device with another embodiment of "pockets".

FIG. 4 shows two magnets 82 applied to a holding apparatus 80. The magnets are held on the holding apparatus 80 by a holding element (not shown) and positioned by pins 84. Pins 84, each of which forms a pocket for a respective magnet 82, provide a guide for magnets 82. In other words, pins 84 are long enough, e.g. with a same height as the thickness of the magnet, so that magnets 82 are still guided between the pins 84 after magnets 82 are transferred from holding apparatus 80 to a rotor (not shown). After a curing time for the adhesive used has elapsed, the holding apparatus 80 can be moved upwards, so that the magnets 82 move out of the pockets formed by the pins 82.

Figure 5:
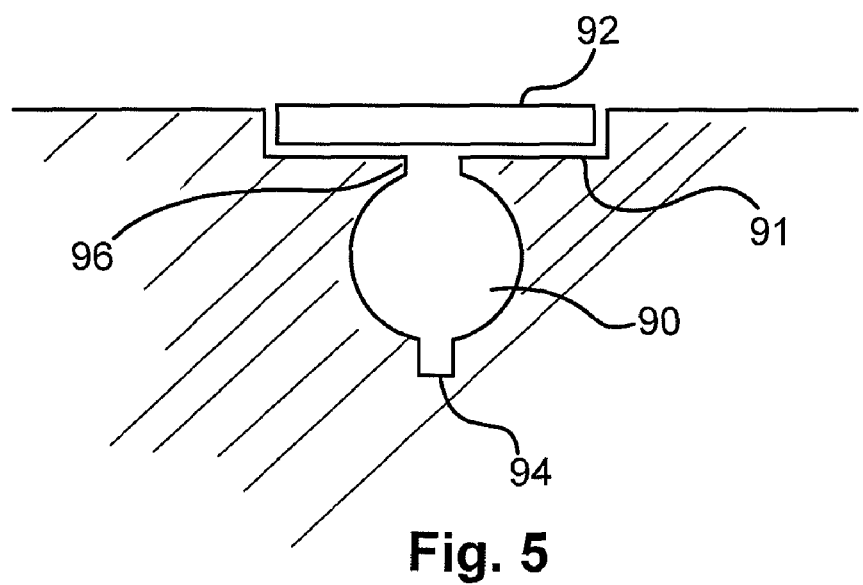
FIG. 5 is a cross sectional view of a pocket with a recess for accommodating a guide pin.

FIG. 5 shows a recess 90 for accommodating a pin (not shown). Once the pin has been pushed into the recess 90, a magnet 92 is held by the pin due to magnetic attraction between the magnet and the pin. The pin can make contact with the magnet 92, or there may be a small gap between the magnet 92 and the pin.

The drawing also shows a travel surface 94 for the ejector 56 mounted on the pin and a step 96 for a clean transition from the recess 90 to the pocket 91.

The invention claimed is:

1. Method of applying at least one magnet to a surface of a component made of a magnetic material, comprising:
    placing the at least one magnet in a holding apparatus,
    positioning the holding apparatus in an immediate vicinity of the component,
    holding the at least one magnet in the holding apparatus by a holding element applying a holding force to the at least one magnet such that the at least one magnet does not contact the surface of the component, and
    deactivating the holding element such that the holding force is reduced and the at least one magnet is transferred to the surface of the component by a magnetic force of the at least one magnet to the component, wherein the component is a rotor of an electric motor, the electric motor includes a stator, and the surface of the component is a rotor surface facing in a direction of the stator.

2. Method according to claim 1, wherein the at least one magnet includes a row of magnets.

3. Method according to claim 2, wherein positioning the holding apparatus further comprises positioning the holding apparatus such that the row of magnets is applied to the surface of the component directly adjacent to a row of magnets previously applied to the surface of the component.

4. Method according to claim 1, further comprising adhesively bonding the at least one magnet to the surface of the component.

5. Method according to claim 1, wherein the method is executed with assistance of a robot.

6. Method according to claim 1, wherein positioning the holding apparatus further comprises positioning the holding apparatus such that it is complementary to the rotor surface.

* * * * *